United States Patent [19]

Ferguson et al.

[11] 4,072,240
[45] Feb. 7, 1978

[54] TEXTILE BOBBIN HOIST

[75] Inventors: Richard Ferguson; Kenneth W. Troutman, both of Charlotte, N.C.

[73] Assignee: The Terrell Machine Company, Charlotte, N.C.

[21] Appl. No.: 733,390

[22] Filed: Oct. 18, 1976

[51] Int. Cl.² .............................................. B65G 65/04
[52] U.S. Cl. .................................... 214/313; 214/307; 214/707; 214/740
[58] Field of Search .................. 221/16; 220/334, 335; 222/477; 214/707, 740, 307, 302, 46.26, 46.28, 313, 46.3; 187/9 R

[56] References Cited

U.S. PATENT DOCUMENTS

| | | | |
|---|---|---|---|
| 1,723,003 | 8/1929 | Barrett | 214/707 |
| 2,236,310 | 3/1941 | Deal | 214/707 |
| 2,459,204 | 1/1949 | Van Vleck | 214/307 |
| 2,647,651 | 8/1953 | Vincent | 214/707 |
| 3,138,275 | 6/1964 | Dempster et al. | 220/335 |
| 3,226,783 | 1/1966 | Draxler | 214/707 |
| 3,486,647 | 12/1969 | Seragnoli | 214/302 |

FOREIGN PATENT DOCUMENTS 206,989  11/1923  United Kingdom ................. 214/707

*Primary Examiner*—Lawrence J. Oresky
*Attorney, Agent, or Firm*—Richards, Shefte & Pinckney

[57] ABSTRACT

A bobbin hoist powered by an air cylinder has a skip for holding, lifting, tilting, and dumping bobbins and is provided with skip guiding tracks to give substantially constantly increasing hoisting cable pull during tilting and dumping. A hinged door over the dumping mouth of the skip opens slowly to control dumping. Alternatively, a hinged dumping chute under the dumping mouth of the skip blocks dumping until the chute slowly unfolds downwardly to dumping position; a narrowed mouth on the chute further controls the bobbins for hand feeding therefrom.

10 Claims, 6 Drawing Figures

TEXTILE BOBBIN HOIST

BACKGROUND OF THE INVENTION

Textile bobbins are commonly collected from a given process in boxes holding hundreds or thousands of bobbins, these bobbins must be transported to the next process, and then the bobbins must be hoisted and be dumped into a hopperlike receptacle prior to further processing. Hoists with cables to pull up and tilt over a skip or car holding bobbins and guided by rollers on tracks are commonly used, and the cables are usually powered by gearmotors driving cable drums or by hydraulic cylinders operating pulley and cable tackle. U.S. Pat. No. 2,236,310 generally illustrates a commercially available gearmotor-powered hoist. Pages 1, 2, 3, and 4 of the current K-1569X Bobbin Box Hoist parts catalog, published in August 1968 by the Terrell Machine Co., Charlotte, North Carolina, copies attached, illustrate a commercially available hydraulic cylinder-powered hoist of the air-over-oil type (compressed air admitted to a closed tank containing oil forces oil into the hydraulic cylinder). Such prior art arrangements have been unnecessarily complicated and lack control over the bobbins being dumped, while the hoist provided here is much simplified, operates smoothly, and maintains control over the dumping bobbins for safety or rehandling purposes.

SUMMARY OF THE INVENTION

The bobbin hoist of the present invention comprises improved guiding tracks for the upper and lower rollers of the skip holding the bobbins. The skip is arranged for substantially vertical hoisting to a predetermined height, above which the appropriately curved upper roller tracks cause the skip to gradually tilt approximately 45° with farther hoisting. Still farther hoisting under the control of the again appropriately curved lower roller tracks tilts the skip approximately 75° or more, at which position the upper roller tracks are curved in reverse to bring the skip to a smooth halt at approximately the same time that the air cylinder means pulling the hoisting cables comes to the end of its stroke. Hoisting pull required in the cable increases smoothly and substantially constantly during the ascending tilting skip movement, and decreases likewise during the descending tilting movement, so that air cylinder power is practical.

A door hinged above and closing the dumping mouth of the skip is linked to the skip by a dashpot which only allows the door to open very slowly from the force of the bobbins trying to dump out into the usual hopper, for quiet operation. Level detector signalling means in the bottom surface of the hopper prevents withdrawal of bobbins below a predetermined level at which the bobbins in the hopper cushion the dumping of additional bobbins for ultimate dumping quietness.

A dumping chute extending beyond the dumping mouth of the skip is hinged below the mouth and arranged for movement between a position blocking dumping of bobbins and a second position allowing dumping; a dashpot linked between skip frame and dumping chute controls the rate of movement between the two positions; the mouth of the dumping chute may be narrowed to better adapt the chute for use as a hopper.

DETAILED DESCRIPTION OF THE INVENTION

Figure 1:
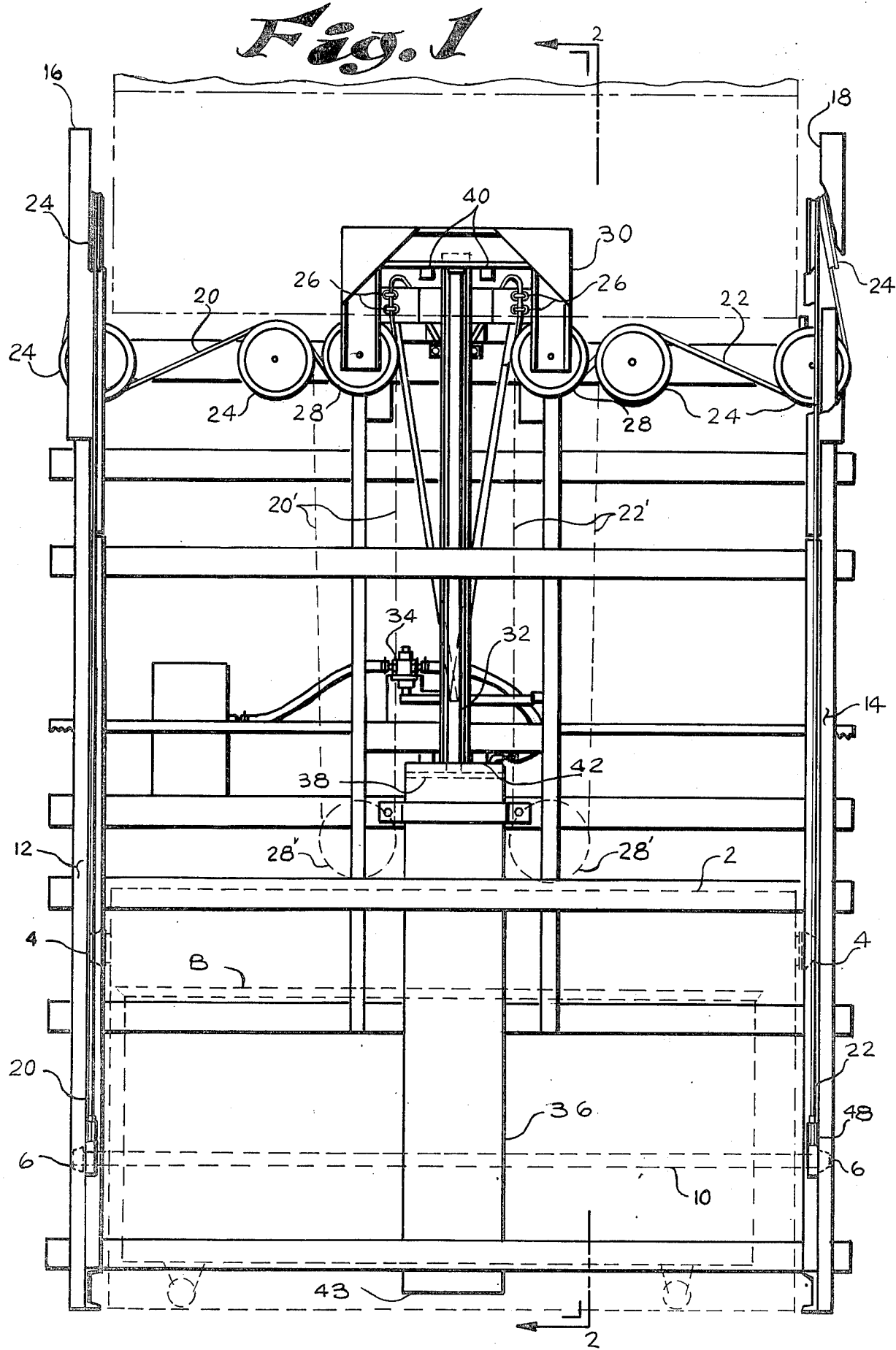
FIG. 1 is a rear elevation of a hoist embodying the present invention.
Figure 2:
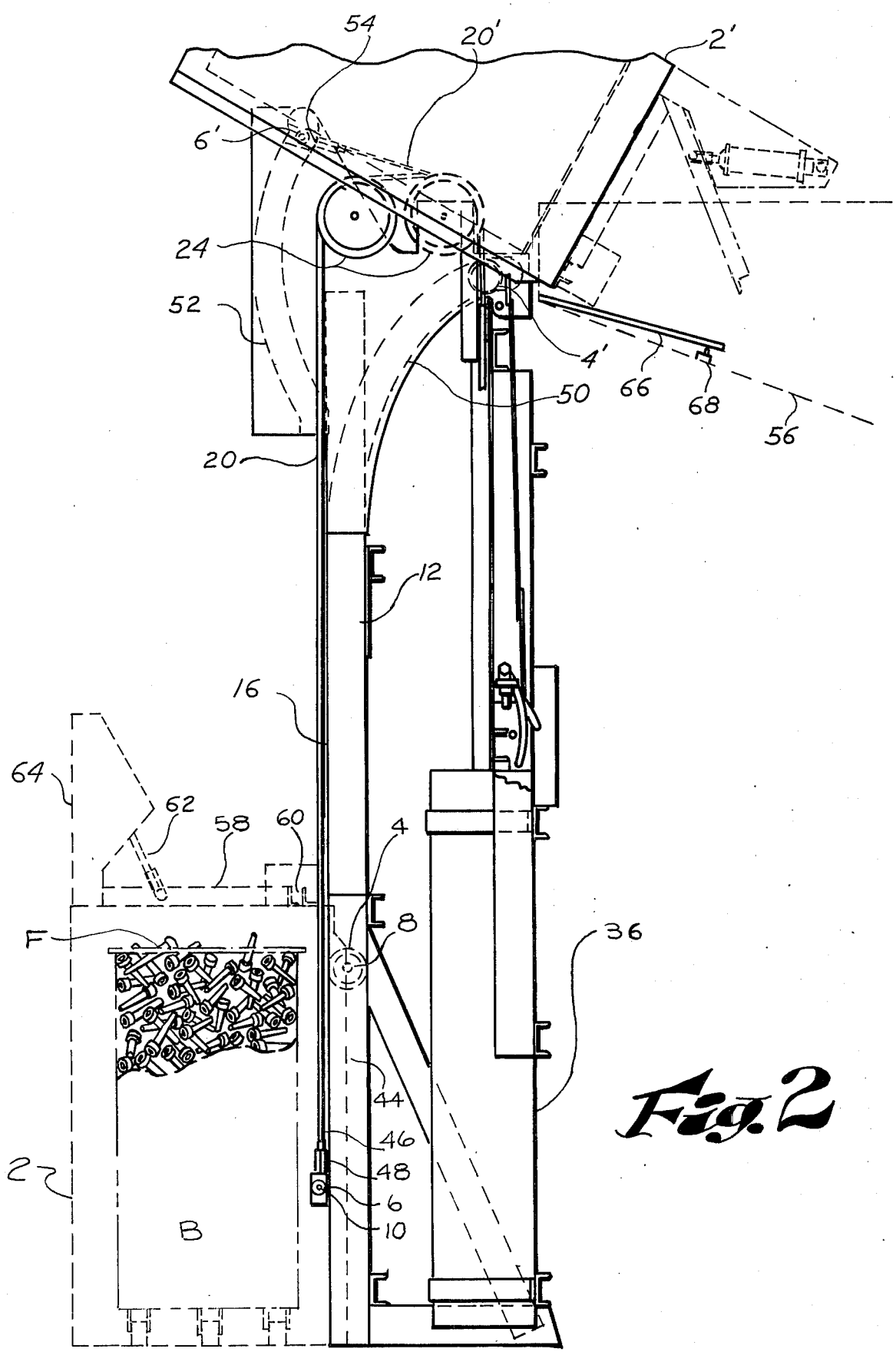
FIG. 2 is a vertical section taken substantially at line 2—2 of FIG. 1.

In the illustrated embodiment, a typical box B of bobbins F is shown in FIGS. 1 and 2 loaded in the hoisting skip 2 of the hoist of the present invention. Skip 2 is a rectangular, box-like framework of structural steel, open at the sides thereof for admission of boxes B, and closed on its front and bottom by sheet steel. Upper rollers 4 and lower rollers 6 are mounted for free rotation on stud shafts 8 and through shaft 10 respectively, which are in turn attached to the sides of skip 2. Upper rollers 4 are adapted to roll in and be guided by the matching roller tracks 12 and 14, and lower rollers 6 are adapted to roll in and be guided by roller tracks 16 and 18. Hoisting cables 20 and 22 are hitched to shaft 10 between rollers 6 and the sides of skip 2 respectively. Hoisting cables 20, 22 are trained around four pulleys 24 at each side of the hoist, and said cables 20, 22 are finally attached to the framework of the hoist by cable clamps 26 near the vertical center line of the hoist as seen in FIG. 1, after said cables have been trained around pulleys 28 at each side respectively of yoke 30.

Yoke 30 is fixed to the extended end of piston rod 32, both shown at fully extended positions in FIG. 1. At said extended position of yoke 30, pulleys 28 form minimum loops in cables 20, 22 trained around said pulleys 28. Retraction or extension of piston rod 32, yoke 30, and yoke pulleys 28 is effected by admission or exhaust of compressed air through well-known valve 34 to the upper portion of air cylinder 36, above piston 38 which is fixed to the lower end of piston rod 32. Said retraction of pulleys 28 toward air cylinder 36 pulls increasingly larger loops in cables 20, 22, thereby retracting the cables 20, 22 as trained around pulleys 24 respectively, and pulls upwardly on the respective ends of cables 20, 22 hitched to shaft 10 at the sides of skip 2. Stops 40 attached to yoke 30 bear against the top surface of cylinder head 42 of cylinder 36 to limit the retracting travel of piston rod 32 and associated parts. At maximum retraction, pulleys 28 assume the position shown in broken lines at 28' and pull the maximum loop in cables 20, 22 as shown by 20', 22'; cables 20, 22 at this point have pulled skip 2 into dumping position as shown by 2', and the pulling end of cable 20' has lifted off the last in the series of frame pulleys 24 and extends to lower roller 6' in its uppermost position.

FIG. 2 shows rollers 4 and 6 located in vertical portions 44 and 46 respectively of upper roller tracks 12, 14 and lower roller tracks 16, 18. As shown in FIG. 2, the pulling end 48 of cable 20 pulls on shaft 10 essentially vertically. Thus, skip 2 is raised vertically and untilted until upper roller 6 enters the upper curved portion 50 of upper roller track 12. Thereafter, upper roller 4 follows the contour of curved portion 50 of track 12 until upper roller 4 reaches its approximate maximum upper position as shown at 4', thereby tilting skip 2 approximately 45° forward from its original position at the floor and upwardly with respect to, and partially over, the rollers 4 and 6. Curved portion 50 is shaped such that the interaction of said shape with upper roller 4, lower roller 6 and its track 46, and the shifting center of gravity of skip 2 causes the required pull in cable 20 to increase substantially constantly during said travel of roller 4 to position 4'. When roller 4 has reached position 4' approximately, lower roller 6 is pulled into the upper curved portion 52 of lower roller track 16, where the path of lower roller 6 causes the pulling end 48 of cable 20 to depart from its former vertical pull direction to pull in constantly changing directions as roller 6 travels upwardly in curved portion 52 of track 16 and the skip 2 is thereby tilted farther upwardly with respect to, and completely over, the rollers 4 and 6 and then to a tilted position for dumping, as indicated by the reference numeral 2', when the roller 6 has reached its maximum upward position as shown at 6'. Curved portion 52 is shaped such that the interaction of the constantly changing pull angle of cable end 48 with said curved portion 52 and with the changing position of the center of gravity of skip 2 causes the required hoisting pull in cable 20 to continue to rise substantially constantly until lower roller 6 reaches its maximum upward position as shown at 6' near the top of curved portion 52. Curved portion 52 provides a reversed curved portion 54 starting at this point such that any tendency of the skip 2 to travel farther upward will be overcome by the increased pull required, and skip 2 is brought to a smooth halt.

As is common practice in air cylinders, cylinder 36 being a single-acting cylinder, its blind end opposite its working end is closed off by a blind end cylinder head 43, and air passage to and from this blind end is restricted by an orifice of such size that at normal operating speeds of piston 38, sufficient back pressure builds up in said blind end to significantly slow the travel rate of piston 38 as said piston approaches the end of its working stroke, said slowing being desirable because the complementary geometry of the upper curved portion 52 of track 16 and the cable pull angles is such as to produce a multiplication of motion of lower roller 6 as compared to the rate of take-up of the cable (comparable to the well-known action of a sailboat traveling faster than the wind which propels it). The negative pressure created in the blind end of cylinder 36 has a similar slowing effect as skip 2 starts its downward travel — in both instances, this slowing effect is more pronounced the closer piston 38 lies to blind end cylinder head 43.

Figure 3:
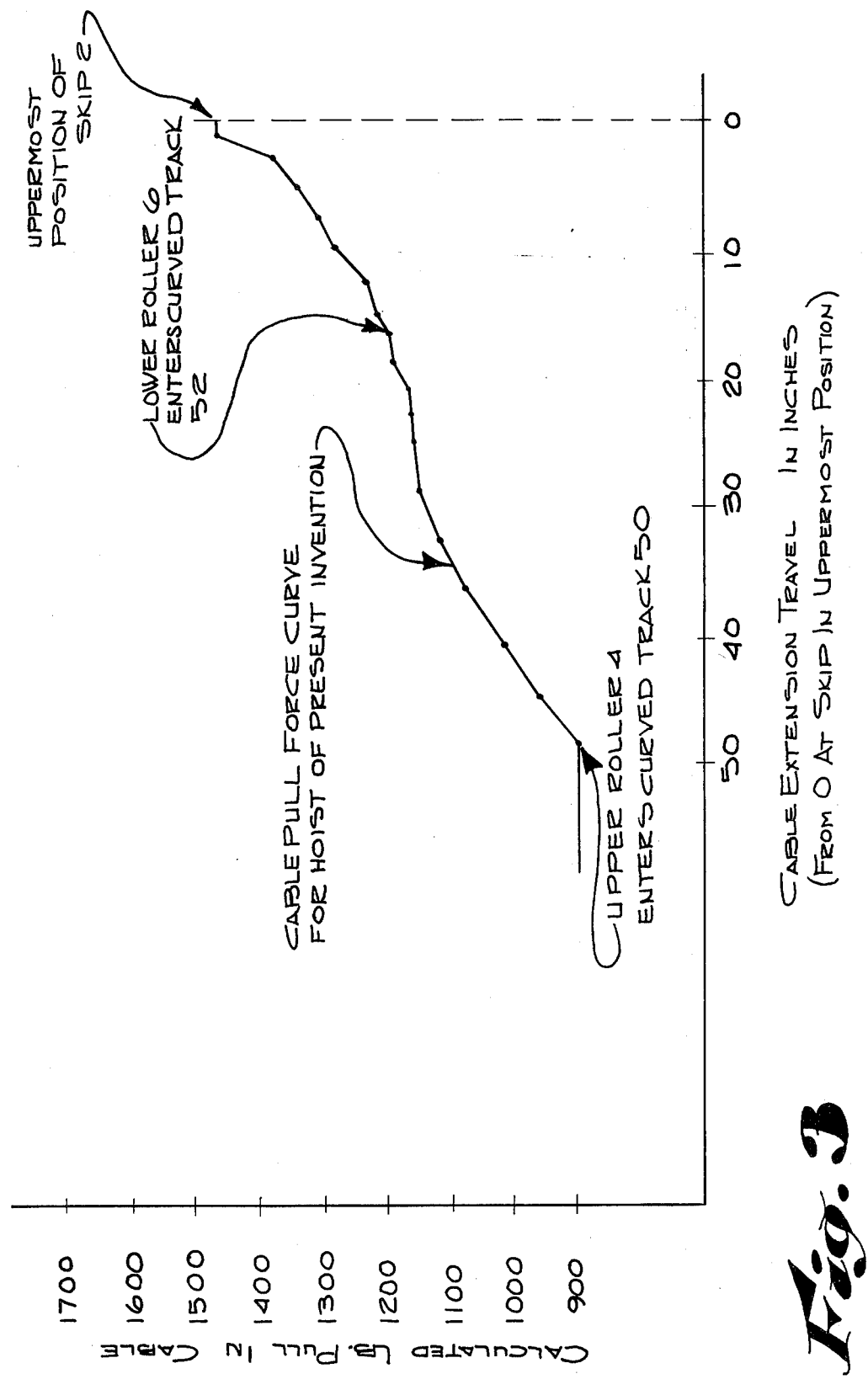
FIG. 3 is a chart showing the general relation between cable pull and cable extension travel.

The smooth and substantially constantly increasing cable pull permits the use of an air cylinder as the power source for the hoist of this invention, whereas extreme variations in cable pull made it impossible in the prior art hoist to use an air cylinder, as the well-known bounciness of an air cylinder resulted in wild, jerky motions of the skip, particularly a sudden downward drop from the uppermost position followed by a rebound upward before smooth downward motion was achieved. The calculated curve of cable pull shown in FIG. 3 illustrates the cable pull of the present invention, which results in skip motion smoother than that of the prior art hoist with a hydraulic cylinder.

The smooth motion of skip 2 as aforesaid is complemented for the control of the noise of dumping bobbins F into an associated hopper 56 by provision of a skip door 58 which normally closes the dumping mouth 60 of skip 2 as skip 2 rests on the floor. Door 58 is linked by a dashpot means 62 to an upward extension 64 of skip 2 as shown in FIG. 2. Door 58 remains in position closing the dumping mouth 60 of skip 2 until skip 2 has been hoisted and tilted about 90° forward from its original position; beyond a 90° tilt of skip 2 gravity and the pressure of bobbins F held in skip 2 apply opening force to door 58, but door 58 is held from opening freely by the well-known action of dashpot means 62, said dashpot means 62 permitting door 58 to open only at the rate permitted by transfer of fluid from one end of the dashpot means 62 to the other end through a metering orifice. Said orifice is of such size that door 58 opens slowly, allowing bobbins F to flow only slowly from skip 2 in its uppermost position as shown at 2'. The noise caused by the flowing bobbins F dropping onto hopper 56 is kept within safety limits for such short term and widely spaced occurrences of noise.

To hold noise at an absolute minimum, it is necessary to retain a level of bobbins in the bottom of hopper 56 so that the next skip load of bobbins dumped will not be able to rush noisily to the lower end of hopper 56. A detector plate 66 is provided toward the upper end of hopper 56 in the bottom thereof, where bobbins F will rest upon said plate 66 and actuate the well-known electrical switch 68 positioned beneath it for such actuation. Switch 68 is commonly connected in the electrical control circuits of the bobbin processing equipment (not shown) which normally draws its supply from hopper 56, preventing the operation of said processing equipment unless switch 68 has been actuated by bobbins F lying on detector plate 66. Where bobbins F are removed manually from hopper 56 for whatever purpose, switch 68 may be connected into a circuit (not shown) for giving a signal to warn that it is time to dump more bobbins.

Figure 4:
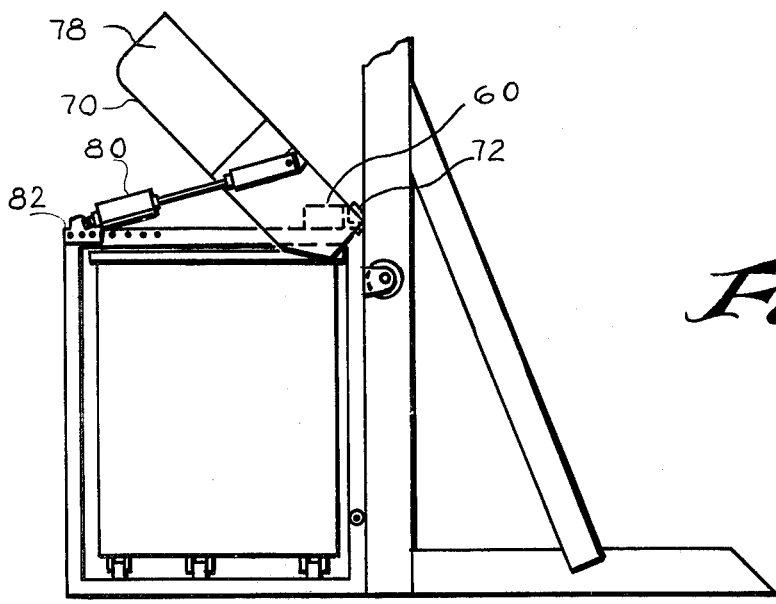
FIG. 4 is a side elevation of a hoist skip located at floor level and equipped with a dumping chute of the present invention.
Figure 5:
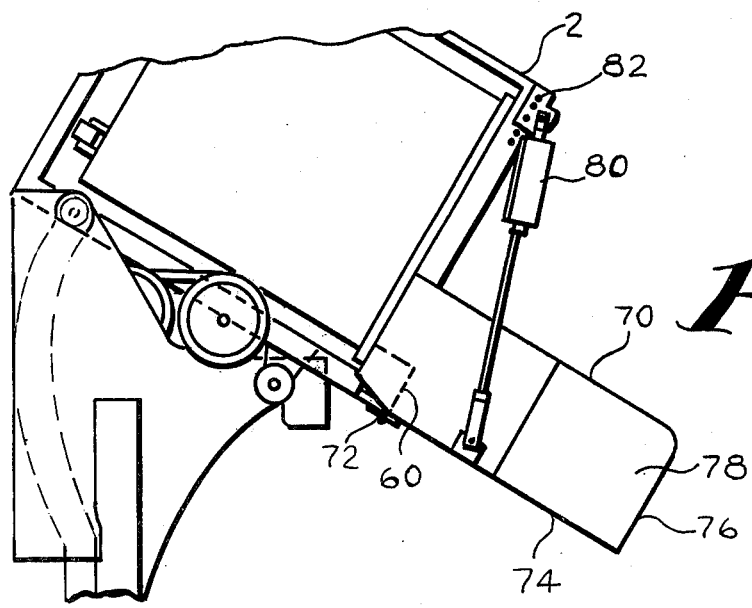
FIG. 5 is a side elevation of the skip of FIG. 4 hoisted into dumping position.
Figure 6:
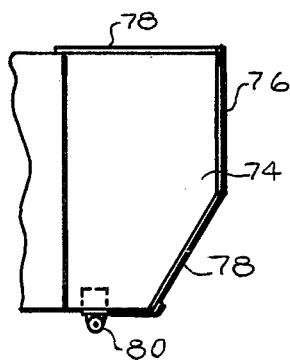
FIG. 6 is a plan view of the dumping chute of FIG. 4.

A dumping chute 70 is provided hinged closely adjacent the dumping mouth 60 of skip 2, the hinge 72 normally being placed under the path of bobbins F flowing from the mouth 60 of skip 2 as shown in dumping position in FIG. 5. Dumping chute 70 folds back on its hinge sufficiently to block dumping mouth 60 of skip 2 when skip 2 is in its loading position as shown in FIG. 4. Dumping chute 70 has a floor 74 for chuting bobbins F toward its own dumping mouth 76, and side walls 78 which are high enough to contain the flowing bobbins F. One or both of side walls 78 may converge to restrict the dumping mouth 76 of this dumping chute 70 for further control of dumped bobbins F. A well-known dashpot 80 is linked between skip 2 and dumping chute 70 as shown in FIGS. 4 and 5, said dashpot 80 regulates the speed with which dumping chute 70 unfolds from its position blocking skip dumping mouth as shown in FIG. 4, to its normal chuting position as shown in FIG. 5. Fluid flow from one side to the other of the piston within dashpot 80 is restricted by a suitable orifice such that skip 2 will be essentially in its dumping position as shown in FIG. 5 before dumping chute 70 unfolds sufficiently to let bobbins F start to flow out. Dashpot 80 also regulates the speed with which dumping chute 70 folds up to blocking position as skip 2 is tilted and lowered back down to its loading position as in FIG. 4.

Dumping chute 70 will commonly be used in lieu of a separate hopper to receive bobbins F so that bobbins F may be retained in chute 70 until manually removed for further processing; therefore, the linking end positions of dashpot 80 may be set at various holes 82 to achieve a suitable slope angle for chute bottom 74.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

We claim:

1. A bobbin hoist having a skip for holding a box of bobbins for hoisting, air powered cable means attached to the skip for lifting and lowering thereof, complementary track guide means for separately engaging and guiding top and bottom portions of the skip for generally vertical hoisting thereof followed by tilting thereof to dump the bobbins therefrom, the skip being located for said vertical hoisting generally on the rear side of said track guide means, said track guide means having upper curved portions thereof for causing the skip to turn at least ninety degrees from its original disposition to dump at the front side of said track guide means, said top portion track guiding means guiding said top portion of the skip to initially tilt the skip during hoisting thereof and said bottom portion track guiding means guiding said bottom portion of the skip for completion of said tilting of the skip during hoisting thereof and after said initial tilting thereof the skip being essentially unrestrained in horizontal direction by said top portion track guiding means and thus free to move in essentially horizontal direction as guided by said bottom portion track guiding means, fixed pulley means located on the front side of, and intermediately of the vertical extent of, said bottom portion track guiding means for guiding said cable means so that the line of pull of said cable means at said skip forms an ever decreasing angle with the normals to said bottom portion track guiding means at the locations where said bottom portion is guided during said completion of said tilting whereby an ever increasing load is applied by said bottom portion of the skip on said bottom portion track guiding means during said completion of said tilting, and said guide means controlling the tilting so that the tilting is effected by substantially constantly increasing cable means pulling force for smoothly controlling the ascent, and conversely the descent of the skip.

2. A bobbin hoist having a skip for holding a box of bobbins for generally vertical hoisting and subsequent dumping of the bobbins and equipped with upper and lower rollers by which the skip is directed in track guideways during ascent and descent, air cylinder powered cable means attached to the skip for lifting and lowering thereof, first track guideways, for said upper rollers, comprising upper curved portions for causing the skip to commence tilting, second track guideways, for said lower rollers, comprising higher upper curved portions for controlling said lower rollers during farther tilting of the skip for dumping the bobbins therefrom and determining the horizontal location of said upper rollers during said farther tilting, said upper rollers being essentially unrestrained in horizontal direction by said first track guideways during said farther tilting and thus free to move in essentially horizontal direction, the skip being located for said vertical hoisting generally on the rear side of said track guideways and said upper curved portions of said track guideways causing the skip to turn at least 90° from its original disposition to dump at the front side of said track guideways thereby causing the center of gravity of the skip to rise with respect to the rollers to a position above the rollers to dump, and pulleys located on the front side of said second track guideways and intermediately of the vertical extent thereof for guiding said cable means so that the line of pull of said cable means at said skip forms an ever decreasing angle with the normals to said second track guideways at the points of tangency of said lower rollers therewith during said farther tilting whereby an ever increasing load is applied by said lower rollers on said second track guideways during said farther tilting, the upper curved portions of said guideways being contoured in complementary fashion so that the tilting of the skip during ascent is effected by a substantially constantly increasing cable means pulling force for smoothly controlling the ascent, and conversely, the descent of the skip.

3. A bobbin hoist as defined in claim 1 wherein said cable means is powered by compressed air cylinder means, the extending end of said cylinder means having a yoke mounted thereat carrying pulleys for cables running to the respective sides of said skip, and which pulleys are moved in retraction of said cylinder means by air pressure for drawing loops in said cables for raising said skip and are allowed to extend with said cylinder means to permit descent of said skip.

4. A bobbin hoist as defined in claim 2 wherein the upper curved portion of said second guideway terminates in an end shaped for bringing said lower roller to a soft halt when said skip has been raised to its highest point by said cable means.

5. A bobbin hoist according to claim 1, a door over the dumping mouth of said skip to control said dumping, said door hinged above said bobbins.

6. A bobbin hoist according to claim 5, and dashpot means to regulate the opening rate of said door.

7. A bobbin hoist according to claim 5 dumping said bobbins into a bobbin hopper, and a bobbin detector means in said bobbin hopper for signalling presence of a predetermined level of bobbins in said hopper.

8. A bobbin hoist according to claim 1 dumping into a bobbin hopper, and a bobbin detector means in said bobbin hopper for signalling presence of a predetermined level of bobbins in said hopper.

9. A bobbin box hoist as defined in claim 1, a dumping chute extended beyond the dumping mouth of said skip, said dumping chute hinged below said bobbins as they are dumped, and dashpot means to regulate the rate of movement of said dumping chute.

10. A bobbin hoist according to claim 9, the mouth of said dumping chute being narrowed to have an extent approximately half or less of the dumping mouth of said skip.

* * * * *